(12) United States Patent
Sasaki et al.

(10) Patent No.: US 7,811,664 B2
(45) Date of Patent: Oct. 12, 2010

(54) FLUORORESIN COATING FILM

(75) Inventors: Tomohito Sasaki, Shizuoka (JP); Matsunori Takada, Shizuoka (JP)

(73) Assignees: E. I. du Pont de Nemours and Company, Wilmington, DE (US); duPont-Mitsui Fluorochemicals Co Ltd, Wilmington, DE (US)

( * ) Notice: Subject to any disclaimer, the term of this patent is extended or adjusted under 35 U.S.C. 154(b) by 285 days.

(21) Appl. No.: 11/407,161

(22) Filed: Apr. 19, 2006

(65) Prior Publication Data

US 2006/0234063 A1 Oct. 19, 2006

(30) Foreign Application Priority Data

Apr. 19, 2005 (JP) ................ 2005-120460

(51) Int. Cl.
- *B32B 27/06* (2006.01)
- *B32B 27/20* (2006.01)
- *B32B 27/28* (2006.01)

(52) U.S. Cl. .............. 428/325; 428/329; 428/331; 428/421; 428/422

(58) Field of Classification Search .......... None
See application file for complete search history.

(56) References Cited

U.S. PATENT DOCUMENTS

| | | | |
|---|---|---|---|
| 4,179,542 A | 12/1979 | Christofas et al. | |
| 5,229,460 A | 7/1993 | Yousuf et al. | |
| 6,291,054 B1 | 9/2001 | Thomas et al. | |
| 6,592,977 B2 | 7/2003 | Thomas et al. | |
| 6,761,964 B2 | 7/2004 | Tannenbaum | |
| 2003/0021988 A1* | 1/2003 | Tannenbaum | 428/336 |
| 2005/0080210 A1 | 4/2005 | Jing et al. | |

FOREIGN PATENT DOCUMENTS

| | | |
|---|---|---|
| DE | 2546458 A1 | 7/1977 |
| EP | 0318027 A1 | 11/1988 |
| EP | 1 048 751 B1 | 4/2000 |
| JP | 52-44576 | 11/1977 |
| JP | 53-11296 | 4/1978 |
| JP | 3-14194 | 2/1991 |
| JP | 1994346017 A | 12/1994 |
| JP | 7[1995]-67784 | 3/1995 |
| WO | WO 95/21216 | 8/1995 |
| WO | WO 00/56537 | 9/2000 |
| WO | WO 2004/024348 A1 | 3/2004 |
| WO | WO2004/005504 A1 | 8/2004 |

* cited by examiner

*Primary Examiner*—Ramsey Zacharia

(57) ABSTRACT

A fluororesin coating film for improved permeation resistance that maintains excellent wear resistance and also products containing such film. The fluororesin coating has at least two layers that are formed on a substrate where at least one of the layers contains filler with a new Mohs hardness of $\geq 7$ and a tetrafluoroethylene-perfluoro (alkyl vinyl ether) copolymer and tetrafluoroethylene-perfluoro (alkyl vinyl ether) copolymer layer directly below the layer described above.

7 Claims, No Drawings

FLUORORESIN COATING FILM

FIELD OF THE INVENTION

The present invention relates to fluororesin coating films and products containing such coating films, and more specifically concerns fluororesin coating films having improved permeation resistance while maintaining excellent wear resistance, and also products containing such coating films.

BACKGROUND OF THE INVENTION

In general, when a metal substrate such as aluminum, etc., is coated with fluororesins, a primer is applied on the substrate, and then topped with a fluororesin alone to form a two-layer coating. However, when such fluororesin coatings repeatedly make contact with materials having a higher hardness than the fluororesin, the coating is worn out. To prevent this, in general, filler such as mica is included in the topcoating layer for improved wear resistance.

For improving the wear resistance of fluororesin coating layers, adding an inorganic powder with a new Mohs hardness of 8 to fluororesin was proposed in Japanese Kokoku Patent No. HEI 3[1991]-14194, and a method for imparting sufficient hardness to fluororesin films by dispersing superfine diamond particles in the topcoating layer was proposed in Japanese Kokai Patent No. HEI 7[1995]-67784. However, these applications, fillers are included in the fluororesins, thus heat and moisture infiltration can easily occur, leading to substrate corrosion and problems of layer separation between the substrate and primer layer or primer layer and topcoating layer, or the primer layer interior.

Thus, it is desirable that the present invention provide fluororesin coating films with improved penetration resistance, while maintaining excellent wear resistance. It is further desirable that the present invention provide products having fluororesin coating films with excellent wear resistance and improved penetration resistance.

SUMMARY OF THE INVENTION

Briefly stated, and in accordance with one aspect of the present invention, there is provided a fluororesin coating film comprising at least two layers formed on a substrate, said layers consisting of at least one layer containing a filler with a new Mohs hardness of 7 or higher and melt-fabricable fluoropolymer, along with a melt-fabricable fluoropolymer directly below the layer described above.

Pursuant to another aspect of the present invention, there is provided a fluororesin coating film in at least two layers formed on a substrate, with the layers consisting of at least one layer containing a filler with a new Mohs hardness of 7 or higher and tetrafluoroethylene-perfluoro (alkyl vinyl ether) copolymer, along with a tetrafluoroethylene-perfluoro (alkyl vinyl ether) copolymer layer directly below the layer described above.

Pursuant to another aspect of the present invention, there is provided a fluororesin coating film described in the above paragraph where the filler having a new Mohs hardness of 7 or higher has at least one substance selected from the group of diamond powder, corundum powder, quartz rock powder, man-made diamond powder, boron nitride, boron carbide, silicon carbide, fused alumina, silica powder, and mica powder.

Pursuant to another aspect of the present invention, there is provided products having the above described fluororesin coating film, where a product is a cooking utensil.

DETAILED DESCRIPTION

The fluoropolymer used in this invention is melt-fabricable fluoropolymer. Examples of such melt-fabricable fluoropolymers include copolymers of TFE and at least one fluorinated copolymerizable monomer (comonomer) present in the polymer in sufficient amount to reduce the melting point of the copolymer substantially below that of TFE homopolymer, polytetrafluoroethylene (PTFE), e.g., to a melting temperature no greater than 315° C. Preferred comonomers with TFE include the perfluorinated monomers such as perfluoroolefins having 3-6 carbon atoms and perfluoro(alkyl vinyl ethers) (PAVE) wherein the alkyl group contains 1-5 carbon atoms, especially 1-3 carbon atoms. Especially preferred comonomers include hexafluoropropylene (HFP), perfluoro(ethyl vinyl ether) (PEVE), perfluoro(propyl vinyl ether) (PPVE) and perfluoro(methyl vinyl ether) (PMVE). Preferred TFE copolymers include FEP (TFE/HFP copolymer), PFA (TFE/PAVE copolymer), TFE/HFP/PAVE wherein PAVE is PEVE and/or PPVE and MFA (TFE/PMVE/PAVE wherein the alkyl group of PAVE has at least two carbon atoms). The molecular weight of the melt-fabricable tetrafluoroethylene copolymers is unimportant except that it be sufficient to be film-forming and be able to sustain a molded shape so as to have integrity in the undercoat application. Typically, the melt viscosity will be at least $1 \times 10^2$ Pa·s and may range up to about $60\text{-}100 \times 10^3$ Pa·s as determined at 372° C. according to ASTM D-1238.

The present invention provides a fluororesin coating film that has at least two layers formed on a substrate, with the layers consisting of at least one layer containing a filler with a new Mohs hardness of 7 or higher and a tetrafluoroethylene-perfluoro(alkyl vinyl ether) copolymer and tetrafluoroethylene-perfluoro(alkyl vinyl ether) copolymer layer directly below the layer just described.

An embodiment of the present invention is the fluororesin coating film in which the filler having a new Mohs hardness of 7 or greater, comprises at least one filler selected from the group of diamond powder, corundum powder, quartz rock powder, man-made diamond powder, boron nitride, boron carbide, silicon carbide, fused alumina, and silica powder.

A fluororesin coating film that is formed on the substrate aided by the application of a primer layer is a preferred embodiment of the present invention. A more preferred embodiment of the present invention is a fluororesin coating film that is formed on the substrate aided by the application of a primer layer in which the primer layer contains a fluororesin.

Furthermore, the present invention provides products or other instruments containing the above-described fluororesin coating films. An example of products of the present invention with such fluororesin coating film are cooking utensils.

The fluororesin coating films of the present invention have improved penetration resistance, while maintaining excellent wear resistance. According to the present invention, films resistant to blisters and coating-film peeling, and having filler evenly dispersed on the coating film surface, are obtained. Thus, fluororesin coating films having improved hardness, and both penetration resistance and wear resistance, are provided.

As mentioned above, the fluororesin coating films of the present invention have improved penetration resistance while an excellent wear resistance is maintained, thus products having the fluororesin coating films, provided by the present invention, have excellent durability.

The present invention provides fluororesin coating films in at least two layers formed on a substrate, with the layers consisting of at least one layer containing a filler with new Mohs hardness of 7 or higher and a tetrafluoroethylene-perfluoro(alkyl vinyl ether) copolymer, along with a tetrafluoroethylene-perfluoro(alkyl vinyl ether) copolymer layer directly below the layer described above. The present invention also provides for utensils and products containing such fluororesin coating films.

Fluororesin coating films of the present invention contain at least two layers with at least one layer containing filler with a new Mohs hardness of 7 or higher and a tetrafluoroethylene-perfluoro(alkyl vinyl ether) copolymer (may be called PFA resin hereafter). The PFA resin may also contain other fluororesins within the scope of the present invention. Such other resins may be polytetrafluoroethylene (PTFE), etc.

The layer containing PFA resin and filler with a new Mohs hardness of 7 or higher displays excellent wear resistance while the non-tacky nature intrinsic to fluororesins is maintained, thus, it is suitable for a fluororesin topcoat layer.

Examples of preferred fillers with a new Mohs hardness of 7 or higher used in the present invention include diamond powder, corundum powder, quartz rock powder, boron nitride powder, boron carbide powder, silicon carbide, silica powder, and powders of chrysoberyl, topaz, beryl, garnet, quartz, garnet, fused zirconia, tantalum carbide, titanium carbide, alumina, tungsten carbide, etc. Of these fillers, diamond powder, corundum powder, quartz rock powder, boron nitride, boron carbide, silicon carbide, alumina, and silica powder are more preferred, while diamond powder is the most preferred. These fillers may be used alone or as mixtures of two or more.

While there are no special restrictions on the particle size of the fillers having a new Mohs hardness of 7 or higher, those with a maximum particle diameter below 200 μm are preferred, and those below 100 μm are more preferred, to achieve the desired characteristics of the present invention.

One preferred composition for the intermediate layer is a blend of non melt-fabricable fluoropolymer with a melt viscosity in the range from $1\times10^7$ to $1\times10^{11}$ Pa·s and melt fabricable fluoropolymer with a viscosity in the range from $1\times10^3$ to $1\times10^5$ Pa·s.

In the fluororesin coating films, a layer containing a PFA resin is located directly below the layer of the PFA resin mixed with filler having a new Mohs hardness of 7 or higher. When the PFA layer is used for the intermediate coating layer, the relatively soft intermediate layer acts as a cushion, moderating external pressure and abrasion and inhibiting wear of the coating film surface. Thus, further improving the wear resistance.

Typically a coating layer containing fillers in a fluororesin, steam, etc., penetrates through the interface between the resin and filler, leading to substrate corrosion, reaction with the primer, formation of blisters in the coating film upon long-term use, coating-film peeling, etc., which would shorten the coating film service life. The fluororesin coating films of the present invention exhibit excellent penetration resistance against steam, etc., resulting in films having excellent water resistance. With such advantages, the fluororesin coating films of the present invention can be used for a long period of time.

The PFA resin intermediate layer may also contain a tetrafluoroethylene homopolymer (PTFE) and/or modified PTFE containing less than 1 wt % of a modifier such as hexafluoropropylene (HFP), fluoroalkoxytrifluoroethylene, fluoroalkylethylene, chlorotrifluoroethylene, etc. It is known that, in general, the penetration resistance improves with increasing crystallinity of the coating film. Thus, when the intermediate coating layer contains PTFE and/or modified PTFE, the average spherulite diameter of the intermediate coating layer decreases, raising the crystallinity, with the intermediate coating layer which greatly contributes to the penetration resistance of the fluororesin coating films of the present invention. Thus, the inclusion of PTFE and/or modified PTFE in the intermediate coating layer is a preferred embodiment of the present invention.

The PTFE and/or modified PTFE included in the intermediate coating layer can be obtained, e.g., by the radiochemical or thermal decomposition of PTFE of a molding powder, fine powder, etc., or TFE polymerization in the presence of a chain-transfer agent. The PTFE and/or modified PTFE can be purchased as powders with an average particle diameter below 20 μm.

Such PTFE and/or modified PTFE may be included in an amount of 0.001 wt %, preferably of 0.01 wt %, in relation to the combined weight with PFA of the intermediate coating layer. Since PTFE and/or modified PTFE are fluororesins, they are well compatible with the PFA resin, making the penetration of steam, etc., through the resin interfaces difficult.

The inclusion of PTFE and/or modified PTFE is commonly 0.001 wt % or greater and more preferably 0.01 wt % or greater in relation to its combined weight with PFA.

When a non-tacky nature is especially demanded of the fluororesin coating films of the present invention, the filler having a new Mohs hardness of 7 or higher included in the topcoat layer may be microencapsulated with a fluororesin to prevent of exposure of the filler to the coating film surface, to obtain the desired fluororesin coating films with retention of the non-tacky nature. In particular, microencapsulated diamond powder is favorably used for this purpose.

For enhancing the adhesion of the fluororesin coating to substrates, a primer is usually applied as an undercoating on the substrate. Conventionally known primers used in forming fluororesin coatings can be used.

When a primer containing a fluororesin, especially a PFA resin, is used, its adhesive strength with the PFA layer for the intermediate coating layer is high. This is a preferred embodiment of the present invention.

An example of a preferred embodiment for forming the fluororesin coating films of the present invention, is to apply a primer as an undercoating to enhance the adhesion between the fluororesin coating material and substrate, dried, coated with a fluororesin powder coating material as the intermediate coating layer, baked to form the intermediate coating layer, coated with a topcoat powder coating material, and baked again.

Such fluororesin coating films of the present invention can be formed on various product surfaces. The resulting fluororesin coating films of the present invention have improved penetration resistance while an excellent wear resistance is maintained, thus products having the fluororesin coating films of the present invention have excellent durability.

The fluororesin coating films of the present invention display their characteristics in particular when used on cooking utensils. The cooking utensils containing such fluororesin coating films of the present invention are good application examples of the present invention.

For example, when the fluororesin coating films of the present invention are used on heat cooking utensils such as cookers, grill pans, etc., topcoat surfaces with a hardness higher than conventional cooking utensils and excellent wear resistance can be formed. Thus, even when a metal spatula is used, surface peeling or scratching does not occur, and food does not stick for a long time. Also, blisters or coating peeling by water-containing ingredients, etc., does not occur. Thus, cooking utensils can be used for a long period of time.

EXAMPLES

The present invention is explained in further detail with the following examples. However, the present invention is not limited to such examples.

A preferred fluoropolymer material is a powder. An example of such powder (e.g. method of making and characteristics) is described in the following references: KOKOKU S52-44576(JP 77044576 B), KOKOKU S53-11296(JP 78011296 B), KOKAI H6-346017(JP 6346017 A). The MP-102 described in the examples has 10-20 micron particle size, 890-1150 g/l bulk density, 9.7-11.7 g/10 min MFR.

Methods used for measuring the properties of the present invention are described below.

(1) New Mohs Hardness

The new Mohs hardness of each filler is determined according to the materials list known in the art, and the MSDS specifications of each filler.

(2) Average Particle Diameter

Each filler was measured for the size profile by the wet laser diffraction-scattering method (wet method) using the Microtrack MT3000 (manufactured by Nikkiso Co.), with the numerical value of 50% of the diameter being given as the average particle diameter.

(3) Maximum Particle Diameter

Each filler was measured for the size profile by the wet laser diffraction-scattering method (wet method) using the Microtrack MT3000 (manufactured by Nikkiso Co.), and the numerical value of 100% in the distribution table.

Application Examples 1 and 2

1. Powder Coating Material

The powder coating material used for the intermediate coating was a PFA powder coating material MP-102 (manufactured by Mitsui Dupont Fluorochemicals Co.)

The powder coating material for the topcoat was a PFA powder coating material MP-102 as the main component, mixed with a 3-μm diamond micron powder (UF44, manufactured by Diamond Innovation) in a weight ratio of 99:1.

2. Preparation of Test Plate

A test plates were prepared by the procedure given below using the powder coating materials.

A pure aluminum plate (A-1100) as the substrate was surface-degreased with isopropyl alcohol, sufficiently roughed by sandblasting, freed of surface dust by blowing air, and coated with a PFA-resin-containing anticorrosive water-based primer PR-915AL (manufactured by Mitsui-Dupont Fluorochemicals Co.) to a dry thickness given in Table 1.

The coating was dried with hot air at about 120° C. for 10 min and coated with a powder coating material for intermediate coating a post-baking thickness given in Table 1 to form an intermediate coating.

The intermediate coating was topped with a powder coating material and baked at 400° C. for 20 min to obtain a topcoating. The topcoating thickness is given in Table 1.

3. Property Testing

The test plates obtained were evaluated for corrosion resistance as a measure of the penetration resistance and wear resistance by the methods given below.

Results are given in Table 1.

4. Testing Methods

Corrosion Resistance

First, test plate was stored in 0.7-MPa steam at 170° C. for 50 h, gradually allowed to cool to room temperature, immersed in a solution of 20 g of Japanese hodgepodge essence (manufactured by SB Foods) in 1 L of water at 90° C., observed for blisters of the coating, corrosion, etc., at 1-week intervals, and evaluated using the following standards.

5: after 4 weeks, visual observation, no blisters, no corrosion, good appearance 4: after 4 weeks, visual observation, <2-mm blisters, less than 3

3: after 4 weeks, visual observation, >2-mm blisters formed

2: after 3 weeks, visual observation, blisters, corrosion

1: within 2 weeks, visual observation, blisters, corrosion

Wear Resistance

Evaluated with the thrust-type friction wear testing method (JIS K-7218)

The tester used was EFM-III-EN, manufactured by Orientech Co. The counter part was an iron cylinder with an outer diameter of 25.6 φ, internal diameter of 20.0 φ, and cross-sectional area of 2 cm$^2$.

The wear test piece made contact with the counter part cylinder, rotated at a sliding speed of 500 m/sec for 2 min at room temperature under a zero load, then under a 10 kgf load for 10 min, and the loss by wear was measured.

Application Examples 3 and 4

A test plate with layer thicknesses shown in Table 1 were prepared similarly as in Application Example 1 using, as the powder coating material for the topcoat, a PFA powder coating material MP102 mixed with glass flakes with a new Mohs hardness of 7 in a 99:1 weight ratio.

The test plates obtained were subjected to the property evaluation similarly as in Application Example 1. Results are given in Table 1.

Application Example 5

A test plate having the layer thickness shown in Table 1 was prepared by repeating Application Example 1 using an intermediate coat powder coating material consisting of the PFA powder coating material MP-102 (manufactured by Mitsui-Dupont Fluorochemicals Co.) and PTFE TLP-6 (manufactured by Mitsui-Dupont Fluorochemicals Co.) in a weight ratio of 99:1 and a topcoat powder coating material containing the PFA powder coating material MP-102 (manufactured by Mitsui-Dupont Fluorochemicals Co.) and diamond micron powder (manufactured by Diamond Innovation Co., UF445) with an average particle diameter of 3 μm in a weight ratio of 99:1.

The test plate obtained was tested for properties similarly as in Application Example 1. Results are given in Table 1.

Application Example 6

A test plate having the layer thickness shown in Table 1 was prepared by repeating Application Example 1 using an intermediate-coat powder coating material containing the PFA powder coating material MP-102 (manufactured by Mitsui-Dupont Fluorochemicals Co.) and the PTFE additive TLP-6 in a weight ratio of 99:1 and topcoat powder coating material containing the PFA powder coating material MP-102 and glass flakes with a new Mohs hardness of 7 in a weight ratio of 99:1.

The test plate obtained was tested for properties similarly as in Application Example 1. Results are given in Table 1.

Comparative Example 1

A test plate having the layer thickness shown in Table 1 was prepared by repeating Application Example 1 using the PFA powder coating material MP-102 (manufactured by Mitsui-Dupont Fluorochemicals Co.) for a one-layer coating, without the intermediate coat.

The test plate obtained was tested for properties similarly as in Application Example 1. Results are given in Table 1.

Comparative Example 2

A test plate having the layer thickness shown in Table 1 was prepared by repeating Application Example 1 using an intermediate-coat powder coating material containing the PFA powder coating material MP-102 (manufactured by Mitsui-Dupont Fluorochemicals Co.) and diamond micron powder (UF-445, manufactured by Diamond Innovation Co.) with an average particle diameter of 3 μm in a weight ratio of 99:1, and using the PFA powder coating material MP-102 alone for a topcoat.

eter of 40 μm in a weight ratio of 99:1, and using the PFA powder coating material MP-102 alone for a topcoat.

The test plate obtained was tested for properties similarly as in Application Example 1. Results are given in Table 1.

Comparative Example 4

A test plate having the layer thickness shown in Table 1 was prepared by repeating Application Example 1 using an intermediate-coat powder coating material containing the PFA powder coating material MP-102 (manufactured by Mitsui-Dupont Fluorochemicals Co.) and mica flakes (Iridion 153, manufactured by Merck Co.) with an average particle diameter of 40 μm in a weight ratio of 99:1, and a topcoat powder coating material containing the PFA powder coating material MP-102 and diamond micron powder (UF445, manufactured by Diamond Innovation Co.) with an average particle diameter of 3 μm in weight ratio of 99:1

The test plate obtained was tested for properties similarly as in Application Example 1. Results are given in Table 1.

Comparative Example 5

A test plate having the layer thickness shown in Table 1 was prepared by repeating Application Example 1 using the PFA powder coating material MP-102 (manufactured by Mitsui-Dupont Fluorochemicals Co.) mixed with glass flakes with a new Mohs hardness of 7 in a weight ratio of 99:1 for one-layer coating, without the intermediate coat.

The test plate obtained was tested for properties similarly as in Application Example 1. Results are given in Table 1.

TABLE 1

| | | | Appln Ex. 1 | Appln Ex. 2 | Appln Ex. 3 | Appln Ex. 4 | Appln Ex. 5 | Appln Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|
| Topcoat layer | Composition wt % | PFA | 99 | 99 | 99 | 99 | 99 | 99 | 100 | 100 | 100 | 99 | 99 |
| | | Diamond (particle diameter: 3 μm) | 1 | 1 | — | — | 1 | — | — | — | — | 1 | — |
| | | Glass flakes | — | — | 1 | 1 | — | 1 | — | — | — | — | 1 |
| Intermediate coat layer | Composition wt % | PFA | 100 | 100 | 100 | 100 | 99 | 99 | — | 99 | 99 | 99 | — |
| | | PTFE | — | — | — | — | 1 | 1 | — | — | — | — | — |
| | | Diamond (particle diameter: 3 μm) | — | — | — | — | — | — | — | 1 | — | — | — |
| | | Mica (particle diameter: 40 μm) | — | — | — | — | — | — | — | — | 1 | 1 | — |
| Primer layer | | PR-915AL | 100 | 100 | 100 | 100 | 100 | 100 | 100 | 100 | 100 | 100 | 100 |
| Thickness (μm) | | Topcoat layer | 10 | 5 | 10 | 5 | 10 | 10 | 50 | 10 | 10 | 10 | 50 |
| | | Intermediate coat layer | 40 | 45 | 40 | 45 | 40 | 40 | 0 | 40 | 40 | 40 | 0 |
| | | Primer layer | 10 | 10 | 10 | 10 | 10 | 10 | 10 | 10 | 10 | 10 | 10 |
| Corrosion resistance | | | 4 | 4 | 4 | 4 | 5 | 5 | 4 | 4 | 2 | 2 | 1 |
| Wear resistance (mg) | | | 0.8 | 0.9 | 2.1 | 2.3 | 3.6 | 3.1 | 12.5 | 10.2 | 9.2 | 5.5 | 4.8 |

The test plate obtained was tested for properties similarly as in Application Example 1. Results are given in Table 1.

Comparative Example 3

A test plate having the layer thickness shown in Table 1 was prepared by repeating Application Example 1 using an intermediate-coat powder coating material containing the PFA powder coating material MP-102 (manufactured by Mitsui-Dupont Fluorochemicals Co.) and mica flakes (Iridion 153, manufactured by Merck Co.) with an average particle diam- The fluororesin coating films provided by the present invention have improved penetration resistance, while an excellent wear resistance is maintained.

The fluororesin coating films provided by the present invention are resistant to blistering and peeling, with the filler being uniformly dispersed on the coating film surface, resulting in an improved coating film hardness, and the coating films have both penetration resistance and wear resistance at the same time.

The fluororesin coating films of the present invention have improved penetration resistance, while an excellent wear resistance is maintained; thus, when they are formed on equipment surfaces, products having excellent durability can be provided.

The products having the fluororesin coating films of the present invention have excellent durability and are suitable for cooking utensils.

According to the present invention, cooking utensils having excellent durability are provided with fluororesin coating films having improved penetration resistance, while wear resistance is maintained.

It is therefore, apparent that there has been provided in accordance with the present invention, a fluororesin coating film that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A fluororesin coating film comprising:
   a primer layer formed on a substrate;
   an intermediate layer formed on said primer layer, wherein said intermediate layer comprises a first melt-fabricable fluoropolymer and is essentially free from the presence of filler; and
   a topcoat layer formed on said intermediate layer, wherein, said topcoat layer comprises a filler with a new Mohs hardness of 7 or higher and a second melt-fabricable fluoropolymer.

2. A fluororesin coating film according to claim 1, wherein said first melt-fabricable fluoropolymer comprises tetrafluoroethylene-perfluoro(alkyl vinyl ether) copolymer.

3. The fluororesin coating film according to claim 2, characterized in that the filler having a new Mohs hardness of 7 or higher has at least one substance selected from the group consisting of diamond powder, corundum powder, quartz rock powder, man-made diamond powder, boron nitride, boron carbide, silicon carbide, fused alumina, and silica powder.

4. The fluororesin coating film according to claim 1, characterized in that the primer layer contains a fluororesin.

5. A product having a fluororesin coating film described in any of claim 1, 2, 3 or 4.

6. A product according to claim 5, wherein the product is a cooking utensil.

7. A fluororesin coating film according to claim 1, wherein said second melt-fabricable fluoropolymer comprises tetrafluoroethylene-perfluoro(alkyl vinyl ether) copolymer.

* * * * *